Figure 1:
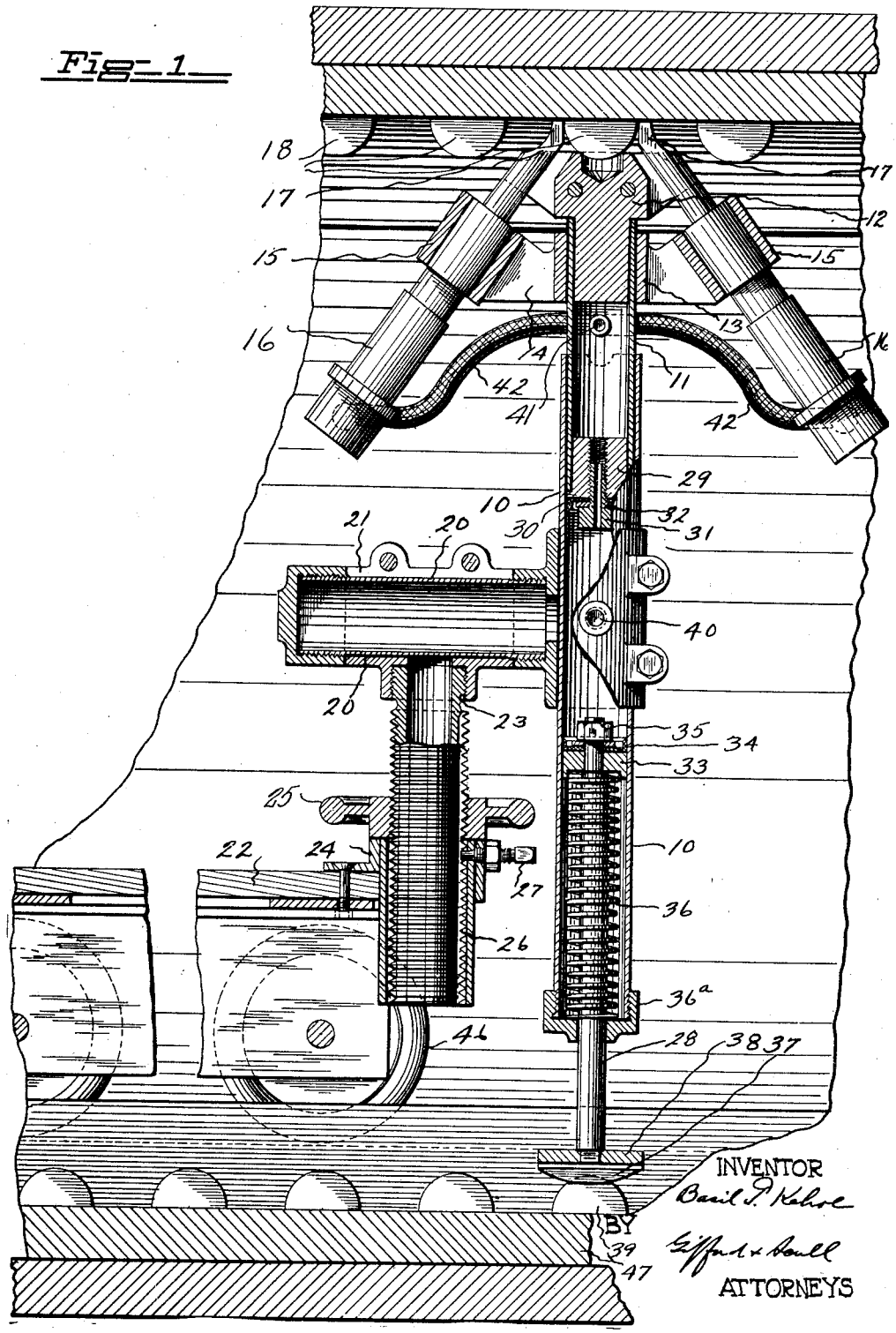

Sept. 24, 1929.     B. T. KEHOE     1,729,346
RIVET CALKING DEVICE
Filed April 23, 1925     2 Sheets-Sheet 1

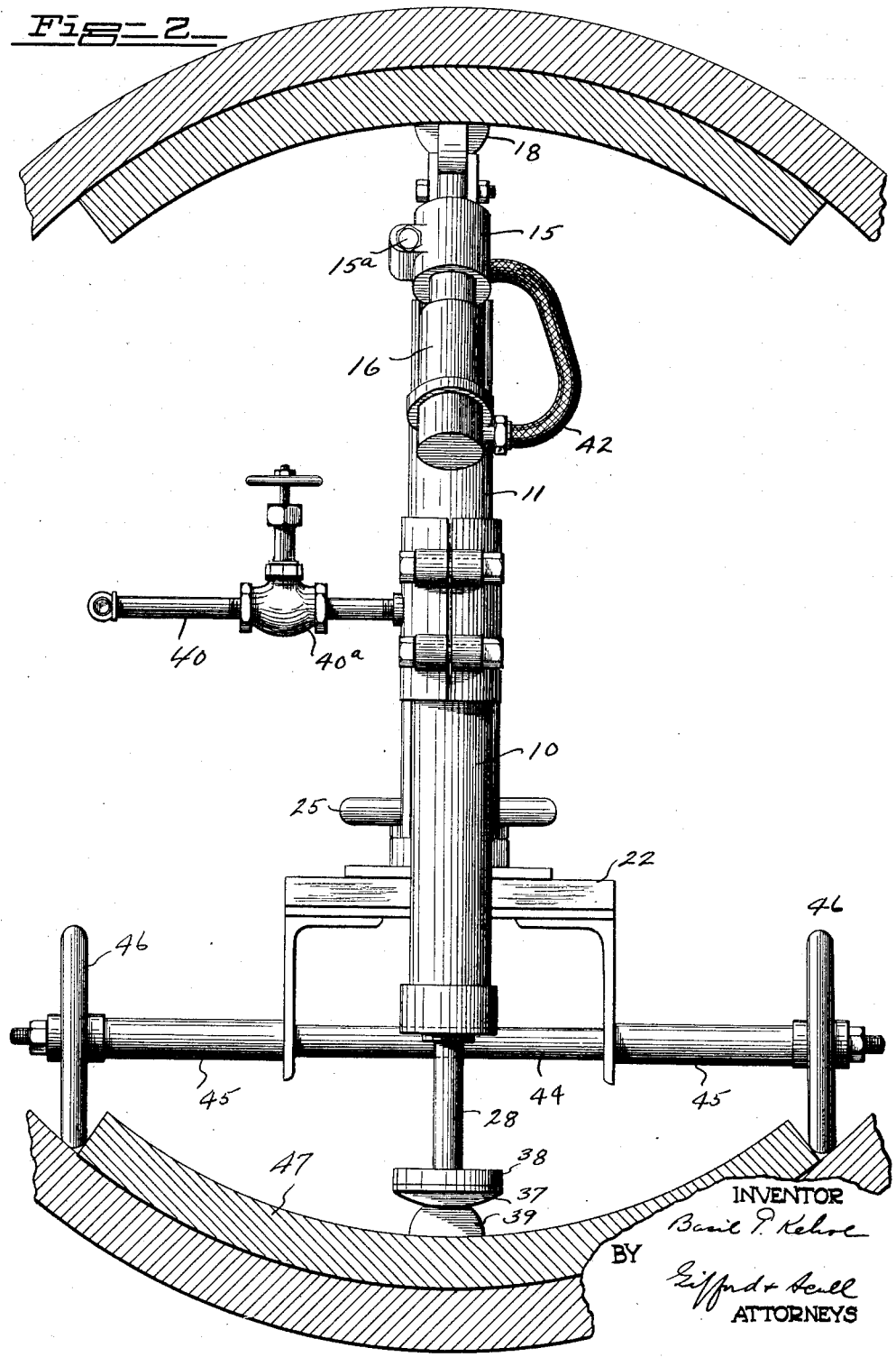

Patented Sept. 24, 1929

1,729,346

UNITED STATES PATENT OFFICE

BASIL T. KEHOE, OF BARBERTON, OHIO, ASSIGNOR TO THE BABCOCK & WILCOX COMPANY, OF BAYONNE, NEW JERSEY, A CORPORATION OF NEW JERSEY

RIVET-CALKING DEVICE

Application filed April 23, 1925. Serial No. 25,456.

My invention relates to the calking of rivets and the like. The following is a description of a device illustrative of my invention for calking the rivet heads interior of a boiler drum. In the appended drawings, Fig. 1 is a view in vertical section of the device shown within a boiler drum, and Fig. 2 is a view in elevation looking from the right of Fig. 1.

Like reference characters indicate like parts in the different views.

In the illustrative arrangement, I have shown my invention embodied in an arrangement for calking the rivet heads on the interior of a drum. In such arrangement, one or more, preferably two, oppositely disposed calking tools are held in calking position by means of an extensible support terminating in a member adapted to grip or contact with a lower sector of the rivet and to serve as a means for centering the calking tools with respect thereto. The support is trunnioned at its approximate mid-point in a bearing adjustably mounted upon a carriage whereby the calking tools may be directed against a rivet in any part of the interior of a boiler drum.

Referring to the drawings by characters of reference, 10 denotes a hollow, cylindrical support having an extensible portion 11 fitting therein to which is fastened a rivet gripping and centering head 12. Attached to portion 11 is a collar 13 having integral therewith a bracket 14 provided with oppositely disposed split yokes or collars 15, 15 in which may be mounted the customary pneumatic hammers 16, 16 having calking tools 17, 17, preferably directed against opposite portions of the rivet head 18. Hammers 16 are removably held in yokes 15 by means of set screws 15ª. These pneumatic hammers are standard in the art and per se form no part of my present invention.

Support 10 is provided preferably at its mid-section with a trunnion 20 having a bearing 21 adjustably mounted on a carriage 22, this mounting consisting of a threaded shaft 23, one end of which is affixed to bearing 21. Shaft 23 is contained in a support 24 borne by carriage 22 and is moved up and down in said support by means of a hand wheel 25 in threaded engagement therewith, rotation of shaft 23 being prevented by means of longitudinal slot 26 (one wall only of which is seen in Fig. 1), in which is engaged a set screw 27 in support 24. By turning hand wheel 25, the bearing 21 may be moved up or down as desired.

Preferably support 10 is extended beyond bearing 21 so as to contact with the portion of the drum opposite the rivet being calked, whereby the reaction of the hammers is directly absorbed by the drum through a reaction member 28 rather than through the carriage 22, although the carriage itself may be used as a reaction member. I also prefer to utilize the air supplied to the hammers to urge gripping member or head 12 against the rivet as well as the reaction member 28 against the opposite portion of the drum. To accomplish this, the extensible portion 11 of support 10 is provided with a piston 29 operating within support 10. Attached to piston 29 is a gasket or packing of leather or other suitable material 30 affixed thereto by means of a centrally bored screw 31, the head of which engages a washer 32 and thus holds the packing 30 firmly in place.

At the opposite end of support 10, reaction member 28 is similarly provided with piston 33 having packing 34 held in place by a washer and a nut 35. Preferably I provide means for retracting member 28 in the form of a spring 36 which acts against piston 33 and a centrally perforated cap 36ª of support 10. Member 28 may be provided with a rubber cushion 37 attached to a head 38 at the end of reaction member 28, and in the drawings, it is shown in contact with a rivet head 39 opposite the rivet 18 which is being calked.

Air under pressure is admitted through pipe 40 having a valve 40ª, the air entering support 10 between the pistons 29 and 33, and leaving extensible portion 11 through an outlet 41, whence it is conducted to the air hammers through hose 42. Support 24 for the bearing 21 is mounted preferably centrally of the carriage 22. Preferably, also, each axle 44 of the carriage is made extensible by means of spacers 45, 45, so that opposite wheels 46, 46 may just span butt strap 47 of the boiler drum, whereby the carriage is securely held within the drum.

In use, the carriage 22 is entered into the boiler drum to be calked, the operator adjusting the height of bearing 21 by hand wheel 25 until the axis of the bearing 21 approximately coincides with the longitudinal axis of the boiler drum. This enables him to calk the rivet on either side of a central, longitudinal, vertical plane without further adjustment of the device.

It will be observed that preliminarily the drum has been turned so that one butt strap is in a lower horizontal position. The operator then swings the centering head 12 opposite a rivet to be calked, and turns on air valve 40$^a$. The air flows from the pipe 40 through the opening in screw 31 into the space above the piston 29, and from thence through the pipes 42 to the calking tools, setting the latter in operation. It will be noted that the air pressure will move piston 29 upward until head 12 contacts with the rivet 18 and similarly will move piston 33 downward until member 38 contacts with the rivet 39.

As soon as the air is turned on and the head 12 pressed in place with the calking tools in operation, the head 12 centering these calking tools around the rivet to be calked, the operator grasps one or both the hammers and rotates them about the axis of the support 10 until the entire periphery of the rivet has been calked, the tube 11 turning in tube 10. On shutting off the air, the spring 36 draws the rod 28 upward and the tools drop by gravity until pipe 41 rests on the top of support 10. The device can then be moved to the next rivet to be calked. The position of the bearing 21 having been once fixed, the tools are brought into calking position with respect to any rivet in the drum by simply moving the carriage the requisite distance lengthwise of the drum and rotating the support and trunnion 20 until the hammers are brought opposite the desired rivet.

It will thus be seen that I have provided a simple and efficient device for holding the hammers operating the calking tools. This manner of calking rivets presents great advantages over hand methods which heretofore have been common practice. When the calking hammer is held by hand, the reaction therefrom is taken up by the arms and body of the operator who must be careful to hold the hammer in the correct calking position while, at the same time, moving the tool around the periphery of the rivet. This is a difficult operation and is fatiguing to the operator, and unless he is skillful and conscientious, may result in damage to the rivet or the strap. By means of my improved device, however, the hammers are maintained at all times in the correct position.

It will be understood that the embodiment above described is illustrative only and that various changes and adaptations may be made without departing from the spirit of my invention or from the scope of the appended claims.

I claim:

1. In a rivet calking device, a gripping head adapted to contact with the head of the rivet to be calked, a fluid operated calking tool adapted to be held by said gripping head in calking position with respect to said rivet, means including a reaction member for holding said gripping head against said rivet head, and means for operating said tool.

2. In a rivet calking device, a gripping head adapted to contact with the head of the rivet to be calked, a fluid operated calking tool held by said gripping head in calking position with respect to said rivet, said calking tool being rotatable around the axis of said gripping head, means including a reaction member for holding said gripping head against said rivet head, and means for operating said tool.

3. In a rivet calking device, a gripping head adapted to contact with the head of the rivet to be calked, a fluid operated calking tool held by said gripping head in calking position with respect to said rivet, means for holding said gripping head against said rivet head comprising a pivoted extensible supporting member, and a reaction member connected thereto, and means for operating said tool.

4. In a rivet calking device, a gripping head adapted to contact with the head of the rivet to be calked, an air operated calking tool held by said gripping head in calking position with respect to said rivet, means for holding said gripping head against said rivet head comprising a pneumatically operated supporting member pivoted intermediate its ends, and a reaction member connected thereto, and means for operating said tool.

5. In a rivet calking device, a gripping head adapted to contact with the head of the rivet to be calked, a fluid operated calking tool held by said gripping head in calking position with respect to said rivet, means for holding said gripping head against said rivet head comprising an extensible supporting member pivoted intermediate its ends, said member being extensible at both ends, and means for operating said tool.

6. In a rivet calking device, means for gripping the head of the rivet to be calked, a plurality of oppositely disposed fluid operated calking tools held by said means in calking position with respect to said rivet, said tools being rotatable around the axis of said gripping means, and means including a reaction member for holding said gripping means against said rivet head.

7. In a rivet calking device, means for gripping the head of the rivet to be calked, a fluid operated calking tool held by said means in calking position with respect to said rivet, means for holding said gripping means against said rivet including a closed elongated cylinder, a piston therein connected to said gripping means, and means to admit air behind the piston.

8. In a rivet calking device, means for gripping the head of the rivet to be calked, a fluid operated calking tool held by said means in calking position with respect to said rivet, means for holding said gripping means against said rivet head including a closed elongated centrally pivoted cylinder, a piston therein connected to said gripping means, said cylinder communicating with a cylindrical portion having a second piston therein connected to a reaction member, a reaction member, and means for admitting air under pressure behind said pistons.

9. In a rivet calking device, means for gripping the head of the rivet to be calked, a fluid operated calking tool held by said means in calking position with respect to said rivet, means for holding said gripping means against said rivet head comprising a pivot, an extensible supporting member supported thereon approximately at its mid-portion and connected to said gripping means, and means to vary the position of said pivot.

10. In a rivet calking device, means for gripping the head of the rivet to be calked, a fluid operated calking tool held by said means in calking position with respect to said rivet, means for holding said gripping means against said rivet head comprising a pivot, an extensible supporting member supported thereon approximately at its mid-portion and connected to said gripping means, means to vary the position of said pivot, and a carriage bearing said pivot.

11. In a rivet calking device, means for gripping the head of the rivet to be calked, a fluid operated calking tool held by said means in calking position with respect to said rivet, means for holding said gripping means against said rivet head including a closed elongated centrally pivoted cylinder, a piston therein connected to said gripping means, said cylinder communicating with a cylindrical portion having a second piston therein connected to a reaction member, a reaction member, means for admitting air under pressure behind said pistons, and means to retract said reaction member.

12. In combination, a support adapted to be entered within a boiler drum, a gripping head on one end of said support adapted to contact with a rivet head, a fluid operated calking tool held by said gripping head in calking position with respect to said rivet, the other end of said support being adapted to contact with a portion of said drum, said support comprising extensible means for urging said gripping head against the rivet head, and means for operating said tool.

13. In combination, a carriage adapted to be entered within a boiler drum, a support pivoted thereon intermediate the ends of the support, a gripping head on one end of said support adapted to contact with a rivet head, a fluid operated calking tool held by said gripping head in calking position with respect to said rivet, the other end of said support being adapted to contact with a portion of said drum, said support comprising extensible means on either side of its pivoted connection for urging said gripping means against the rivet head, and means for operating said tool.

14. In a rivet calking device, a centering head to engage a rivet head, fluid-operated calking tools operatively associated with said centering head and arranged to be positioned in operative position to calk the rivet head when said centering head engages the rivet head, and means including a reaction member to hold the centering head in engaging position.

15. In a rivet calking device, a centering head to engage a rivet head, fluid-operated calking tools operatively associated with said centering head and arranged to be positioned in operative position to calk the rivet head when said head engages the rivet centering head, and means to hold the centering head in engaging position, said means including a cylinder, a piston therein connected to said head, connections to supply fluid under pressure to said cylinder to move said piston therein and connections between said cylinder and said tools to supply fluid under pressure to said tools.

16. In a rivet calking device, a centering head to engage a rivet head, fluid-operated calking tools operatively associated with said centering head and arranged to be positioned in operative position to calk the rivet head when said head engages the rivet centering head, and means to hold the centering head in engaging position, said means including a cylinder, a tubular piston therein having a plug closing one end and having said centering head at the other end, said plug having a restricted opening therein leading to the interior of the piston, connections to supply fluid under pressure to said cylinder and against said plug, and connections for fluid under pressure between the interior of the piston and said calking tools.

17. In combination, calking tools adapted to engage substantially opposite sides of a member to be calked, a support including a reaction member adapted to hold said tools in operative relation to such a member, and means to move said tools towards and away from said member to perform a calking operation.

18. In combination, calking tools adapted to engage substantially opposite sides of a member to be calked, a support including a reaction member adapted to hold said tools in operative relation to such a member, means to move said tools towards and away from said member to perform a calking operation, and means to rotate said tools about said support.

19. In combination, calking tools adapted to engage substantially opposite sides of a member to be calked, a support including a reaction member adapted to hold said tools in operative relation to such a member, means to move said tools towards and away from said member to perform a calking operation, and means to expand said support to bring said tools into said operative position.

20. In combination, calking tools adapted to engage substantially opposite sides of a member to be calked, a support including a reaction member adapted to hold said tools in operative relation to such a member, means to move said tools towards and away from said member to perform a calking operation, and means to mount said support within a drum.

BASIL T. KEHOE.